Figure 1:
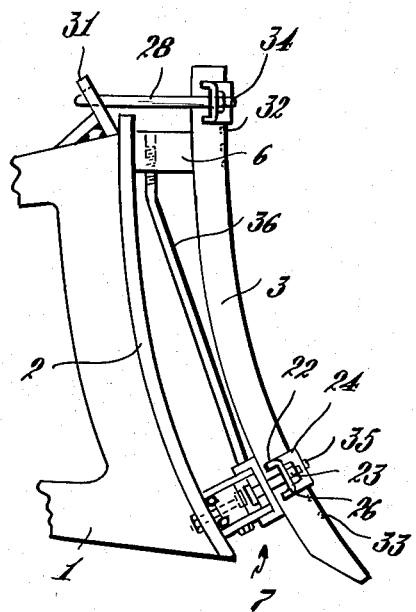

April 4, 1961 — T. V. WILLIAMS — 2,977,696
GRUBBER ATTACHMENT FOR BULLDOZERS
Filed June 8, 1959

INVENTOR.
Thurston V. Williams
BY
Roberts, Cushman & Grover
ATT'YS

United States Patent Office 2,977,696
Patented Apr. 4, 1961

2,977,696

GRUBBER ATTACHMENT FOR BULLDOZERS

Thurston V. Williams, Wilton, N.H., assignor to The O.K. Tool Company, Inc., Milford, N.H., a corporation of New Hampshire Filed June 8, 1959, Ser. No. 818,949

1 Claim. (Cl. 37—145)

This invention relates to an attachment for bulldozers for use in uprooting trees, digging boulders out of the ground and otherwise grubbing objects out of soil, objects of the invention being to provide an attachment which can readily be fitted to any bulldozer, which is simple and economical to produce, which can be rapidly assembled and disassembled, which is readily adjustable to bulldozer blades of different widths, which affords quick and easy adjustment of spacing between tines, which requires no welding operation in the field, and which is durable and reliable in use.

In one aspect the present invention involves a grubber attachment comprising a plurality of tines extending edgewise of the bulldozer blade at spaced locations therealong, together with upper and lower spacing means interposed between the blade and tines near the upper and lower edges of the blade respectively, clamps for holding the tines against the bearing means, and rigid connecting means interconnecting the upper and lower bearing means to hold them in predetermined spaced relationship. Preferably the connecting means is adjustable to vary the distance between the upper and lower spacing means. In the preferred embodiment each of the upper and lower bearing means and the connecting means comprises a separate part for each tine, the connecting means interconnecting the bearing parts, and all three parts of each set are adjustable as a unit lengthwise of the blade to vary the distance between tines.

In another aspect the invention involves a lay bar extending lengthwise of the blade along its lower edge, with means for detachably connecting the lay bar to the blade, a plurality of tines bearing on the lay bar at spaced locations therealong, lower clamping means for holding each tine against the lay bar, bearing means interposed between the blade and tines near the upper edge of the blade, and upper clamping means to hold the upper ends of the tines against the bearing means. Preferably the lay bar has a longitudinal slot and the lower clamping means comprises bolts adjustable along the slot to vary the spacing between the tines. In the preferred embodiment the lay bar comprises upper and lower plates with internal shoulders adjacent the blade, a wedge block between the plates with surfaces bearing on the aforesaid shoulders, and bolts extending through the blocks for drawing them toward the blade, the shoulders and the surfaces being inclined to draw the plates together as the blocks are drawn toward the blade.

Figure 2:
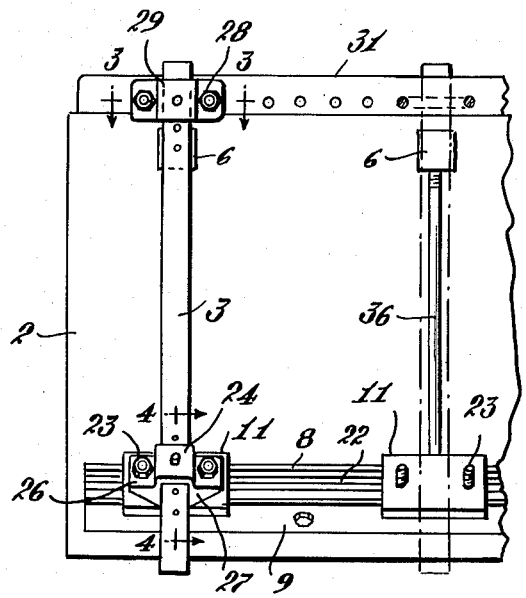
Figure 3:
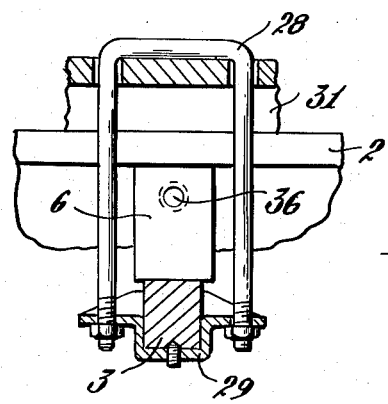
Figure 4:
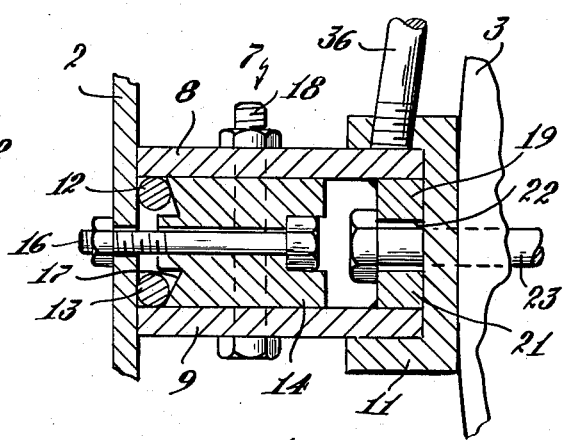

For the purpose of illustration a typical embodiment of the invention is shown in the accompanying drawings in which:

Fig. 1 is a side view;
Fig. 2 is a front view;
Fig. 3 is a section on line 3—3 of Fig. 2; and
Fig. 4 is a section on line 4—4 of Fig. 2.

The particular embodiment of the invention chosen for the purpose of illustration is adapted to be applied to a bulldozer 1 having a blade 2 of usual construction. Extending edgewise of the blade 2 are a plurality of tines 3 distributed at spaced intervals lengthwise of the blade. Interposed between the blade and tines near the upper and lower edges of the blade respectively are spacing means 6 and 7, the upper means comprising rectangular blocks and the lower means comprising elongate plates 8 and 9 extending substantially the full length of the blade and spaced channel-shaped pieces 11 straddling the plate. Welded to the opposing faces of the plates 8 and 9 adjacent to blade 2 are rods 12 and 13 which extend the full length of the plates. At spaced intervals between the plates 8 and 9 are blocks 14 and bolts 16 extending through openings in the blade. The blocks 14 have inclined surfaces 17 bearing on the inclined surfaces of the rods 12 and 13 so as to draw the plates 8 and 9 together as the blocks are drawn toward the blade by the bolts 16. After the bolts have been tightened the plates may be locked together by means of bolts 18. Welded to the inner faces of the plates 8 and 9 at their forward ends are strips 19 and 21 which extend substantially the full length of the plates, the strips being spaced apart to form a slot 22 for clamping bolts 23. Fitting over the tines near their lower ends are clamps 24 having arms 26 through which the bolts 23 extend, the arms having side flanges 27 bearing against the opposite sides of the tines to prevent the arms 26 from bending or breaking when the bolts 23 are tightened.

The upper ends of the tines are clamped against the bearing blocks 6 by means of U-bolts 28 and brackets 29 like the brackets 24 above described, the U-bolts extending through openings in a T-bar 31 welded to the top of the bulldozer behind the blade 2.

The bearing means 6 and 7 are interconnected by rods 36 threading into the blocks 6 at their upper ends and into the caps 11 at their lower ends. Thus each tine has a set of parts comprising the upper and lower bearings 6 and 7 and the connecting rod 36 which is movable as a unit. By threading the blocks up or down on the rod 36 the distance between the bearing means 6 and 7 may be adjusted before the clamps are applied. To vary the spacing between the tines the clamps are loosened, the clamps 24 are shifted to their new positions, the bolts 23 sliding in slot 22, and the U-bolts 28 are shifted to new openings in the T-bar 31. With the clamps 24 and 29 loosened the tines may be adjusted lengthwise, the tines being provided with recesses 32 and 33 to receive the set screws 34 and 35 to facilitate the location of all of the tines in the same position longitudinally.

From the foregoing it will be evident that the attachment of the present invention can readily be fitted to most bulldozers, it is simple and economical in construction, it can be assembled and disassembled rapidly, it is readily adjustable to bulldozer blades of different widths, the spacing between tines can be quickly adjusted, it requires no welding operation in the field, and it is durable and reliable in use.

It should be understood that the present disclosure is for the purpose of illustration only and that this invention includes all modifications and equivalents which fall within the scope of the appended claims.

I claim:

In combination with a bulldozer blade, a grubber attachment comprising a lay bar extending lengthwise of the blade along its lower edge, said lay bar comprising upper and lower plates with internal shoulders adjacent the blade, a plurality of wedge blocks between the plates with surfaces bearing on said shoulders, and bolts extending through the blocks for drawing them toward the blade, said shoulders and surfaces being beveled to draw the plates together as the blocks are drawn toward the blade, a plurality of tines bearing on the lay bar at spaced locations therealong, lower clamping means holding each tine against the lay bar, bearing means interposed between the blade and tines near the upper edge of the blade, upper clamping means holding the upper ends of the tines against said bearing means, and rigid connecting means interconnecting said lower clamping means and said bearing means so that the bearing means is supported by the lower clamping means.

References Cited in the file of this patent

UNITED STATES PATENTS

| | | |
|---|---|---|
| 2,228,450 | Gaddis | Jan. 14, 1941 |
| 2,371,549 | Sembler et al. | Mar. 13, 1945 |